United States Patent
Hirata

(10) Patent No.: US 10,780,761 B2
(45) Date of Patent: Sep. 22, 2020

(54) INSIDE-OUTSIDE AIR SWITCHING UNIT

(71) Applicant: DENSO CORPORATION, Kariya, Aichi-pref. (JP)

(72) Inventor: Hideki Hirata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 31 days.

(21) Appl. No.: 16/080,056

(22) PCT Filed: Nov. 17, 2016

(86) PCT No.: PCT/JP2016/084095
§ 371 (c)(1),
(2) Date: Aug. 27, 2018

(87) PCT Pub. No.: WO2017/149855
PCT Pub. Date: Sep. 8, 2017

(65) Prior Publication Data
US 2019/0061469 A1 Feb. 28, 2019

(30) Foreign Application Priority Data
Feb. 29, 2016 (JP) ................................ 2016-037901

(51) Int. Cl.
*B60H 1/00* (2006.01)
*B60H 1/12* (2006.01)
(Continued)

(52) U.S. Cl.
CPC ..... *B60H 1/00849* (2013.01); *B60H 1/00857* (2013.01); *B60H 1/12* (2013.01);
(Continued)

(58) Field of Classification Search
CPC .. B60H 1/00849; B60H 1/00857; B60H 1/12; B60H 1/3207; F24F 13/24
(Continued)

(56) References Cited

U.S. PATENT DOCUMENTS

| 7,958,740 B2 * | 6/2011 | Hirai | B60H 1/00849 165/223 |
| 2007/0218824 A1 * | 9/2007 | Bailey | B60H 1/00849 454/139 |

(Continued)

FOREIGN PATENT DOCUMENTS

| EP | 1930193 A2 * | 6/2008 | ......... B60H 1/00521 |
| JP | S62037768 Y2 | 9/1987 | |

(Continued)

*Primary Examiner* — Tho V Duong
(74) *Attorney, Agent, or Firm* — Harness, Dickey & Pierce, P.L.C.

(57) ABSTRACT

An inside-outside air switching unit includes a switching member in an inside-outside air case and a drive unit that is configured to operate the switching member. The switching member is configured to open and close an outside-air inlet and an inside-air inlet. The switching member includes a first switching door and the second switching door. The first switching door is configured to be positioned by the drive unit to open the outside-air inlet in the inside-outside air intake mode. The second switching door is configured to be positioned by the drive unit to open the inside-air inlet in the inside-outside air intake mode. The drive unit is configured to move the first switching door to close an inside-outside communication passage, which is defined in the inside-outside case between the outside-air inlet and the inside-air inlet, in the inside-outside air intake mode.

6 Claims, 5 Drawing Sheets

(51) Int. Cl.
*F24F 13/24* (2006.01)
*B60H 1/32* (2006.01)

(52) U.S. Cl.
CPC ........... *B60H 1/3207* (2013.01); *F24F 13/24* (2013.01); *B60H 1/00028* (2013.01); *B60H 1/00785* (2013.01); *B60H 1/00828* (2013.01); *B60H 2001/00085* (2013.01)

(58) Field of Classification Search
USPC ....................................................... 165/202
See application file for complete search history.

(56) References Cited

U.S. PATENT DOCUMENTS

| | | | |
|---|---|---|---|
| 2010/0009620 A1* | 1/2010 | Kawato | B60H 1/00685 454/241 |
| 2012/0214394 A1* | 8/2012 | Kanemaru | B60H 1/00471 454/139 |
| 2014/0065943 A1* | 3/2014 | Clemence | B60H 1/00021 454/265 |
| 2015/0017899 A1* | 1/2015 | Kim | B60H 1/008 454/75 |
| 2015/0044958 A1 | 2/2015 | Kehimkar et al. | |

FOREIGN PATENT DOCUMENTS

| | | |
|---|---|---|
| JP | H10109517 A | 4/1998 |
| JP | 2003080926 A | 3/2003 |
| JP | 2005014811 A | 1/2005 |
| JP | 2015033999 A | 2/2015 |

\* cited by examiner

INSIDE-OUTSIDE AIR SWITCHING UNIT

CROSS REFERENCE TO RELATED APPLICATIONS

This application is a U.S. National Phase Application under 35 U.S.C. 371 of International Application No. PCT/JP2016/084095 filed on Nov. 17, 2016 and published in Japanese as WO/2017/149855 A1 on Sep. 8, 2017. This application is based on and claims the benefit of priority from Japanese Patent Application No. 2016-037901 filed on Feb. 29, 2016. The entire disclosures of all of the above applications are incorporated herein by reference.

TECHNICAL FIELD

The present disclosure relates to an inside-outside air switching unit that is configured to set an inside-outside air intake mode taking in both of outside air and inside air.

BACKGROUND ART

Inside-outside air switching units are known to take in inside air, which has a higher temperature than outside air, in addition to the outside air in order to reduce a heating load in an outside-air drawing mode (for example, refer to Patent Literature 1). Patent Document 1 discloses an air conditioner for a vehicle that includes an intake door being configured to open and close an outside-air inlet and an inside-air inlet and being provided with a ventilation hole. The air conditioner is configured to take in the inside air by opening the ventilation hole in the outside-air drawing mode.

PRIOR ART DOCUMENT

Patent Document

Patent Document 1: JP S62-37768 Y2

SUMMARY OF INVENTION

However, the inside-outside air switching unit disclosed in Patent Document 1 is configured to allow the outside-air inlet and the inside-air inlet to come in communication with each other through an interior space of the inside-outside air switching unit in the outside-air drawing mode. In this configuration, noise may transmit from an outside of a vehicle compartment to an inside of a vehicle compartment through the inside-air inlet in the outside-air drawing mode.

It is an objective of the present disclosure to produce an inside-outside air switching unit that is configured to take in both outside air and inside air in an inside-outside air intake mode while preventing noise from transmitting from an outside of a vehicle compartment to an inside of the vehicle compartment.

In an aspect of the present disclosure, an inside-outside air switching unit is configured to set, as an air intake mode, an inside-outside air intake mode taking in both of outside air and inside air.

The inside-outside air switching unit includes an inside-outside air case, a switching member in the inside-outside air case, and a drive unit. The inside-outside air case includes an outside-air inlet configured to take in the outside air and an inside-air inlet configured to take in the inside air. The switching member is configured to open and close the outside-air inlet and the inside-air inlet. The drive unit is configured to operate the switching member.

The switching member includes a first switching door and a second switching door. The first switching door is configured to be positioned by the drive unit to open the outside-air inlet in the inside-outside air intake mode. The second switching door is configured to be positioned by the drive unit to open the inside-air inlet in the inside-outside air intake mode.

The drive unit is configured to position the first switching door to close an inside-outside communication passage in the inside-outside air intake mode. The inside-outside communication passage is defined in the inside-outside air case and connects the outside-air inlet and the inside-air inlet to each other.

That is, in the inside-outside air intake mode, one, i.e., the first switching door, of the first and second switching doors closes the inside-outside communication passage connecting the outside-air inlet and the inside-air inlet to each other. As such, noise from the outside of the vehicle compartment can be prevented from transmitting to the inside of the vehicle compartment through the inside-outside communication passage.

More specifically, in the inside-outside air intake mode, the first switching door, which is configured to open and close the outside-air inlet, closes the inside-outside communication passage. Accordingly, the first switching door changes an open area of the inside-air inlet and thereby adjusting a volume of the inside air to take in.

Therefore, the present disclosure can produce the inside-outside air switching unit that is configured to take in both outside air and inside air in an inside-outside air intake mode while preventing noise from transmitting from an outside of a vehicle compartment to an inside of the vehicle compartment.

DESCRIPTION OF EMBODIMENTS

Hereinafter, embodiments of the present disclosure will be described with reference to the drawings. In the following embodiments, parts, which are the same as or equivalent to those described in the preceding embodiment(s), will be indicated by the same reference signs, and the description thereof may be omitted. Also, in the following embodiments, when only some of the constituent elements are described, corresponding constituent elements of a previously described one or more of the embodiments may be applied to the rest of the constituent elements. The following embodiments may be partially combined with each other even if such a combination is not explicitly described as long as there is no disadvantage with respect to such a combination.

First Embodiment

Figure 1:
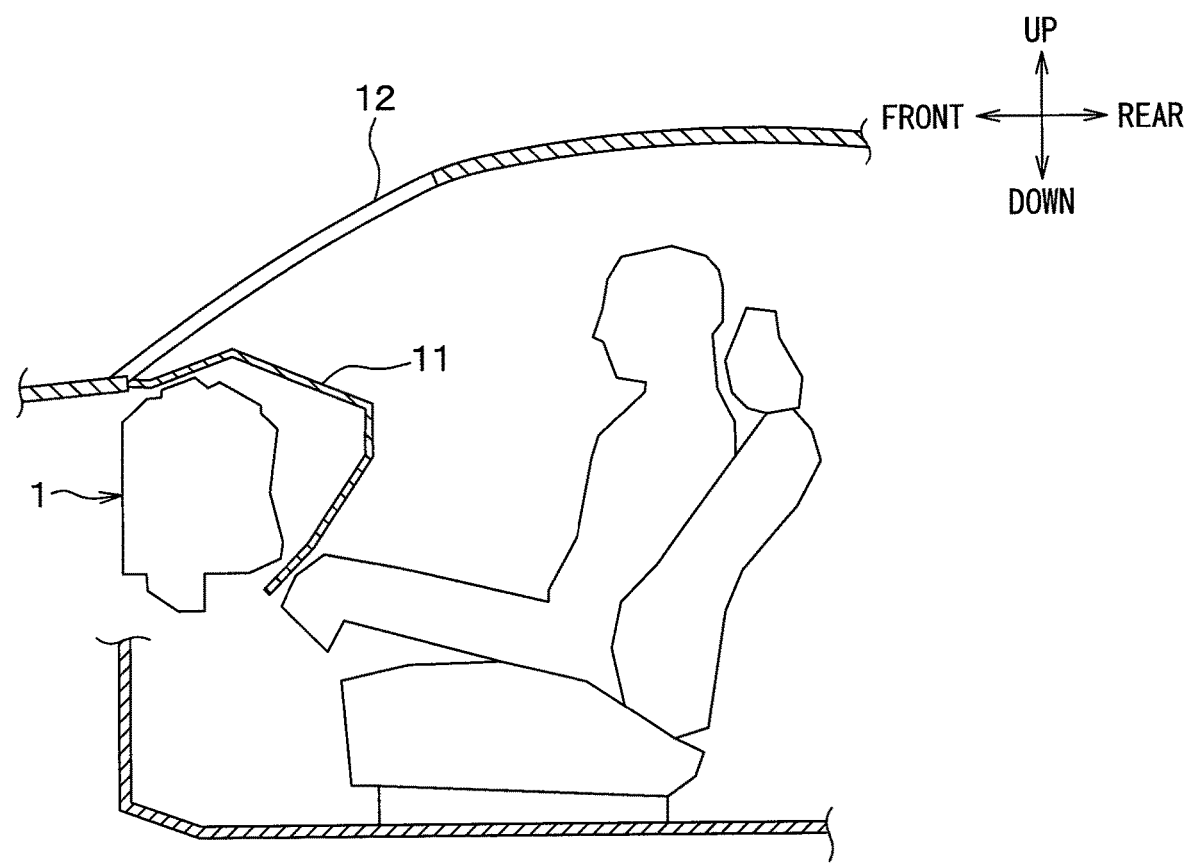
FIG. 1 is a schematic diagram showing an air conditioner for a vehicle being mounted to the vehicle.

The present embodiment will be described with reference to FIGS. 1 to 8. FIG. 1 is a cross-sectional view schematically showing a side of a vehicle mounting an air conditioner 1 for a vehicle including an inside-outside air switching unit 2 of the present disclosure. Orientation indicators showing an up-down direction and a front-rear direction in the drawings indicate an up-down direction and a front-rear direction with the air conditioner 1 mounted to the vehicle.

The air conditioner 1 for a vehicle shown in FIG. 1 is a device that is configured to adjust a temperature in the vehicle compartment by supplying air, of which temperature is adjusted to be a required temperature, into the vehicle compartment. As shown in FIG. 1, the air conditioner 1 is arranged inside an instrument panel 11 positioned in a front area in the vehicle compartment inside the vehicle.

Figure 2:
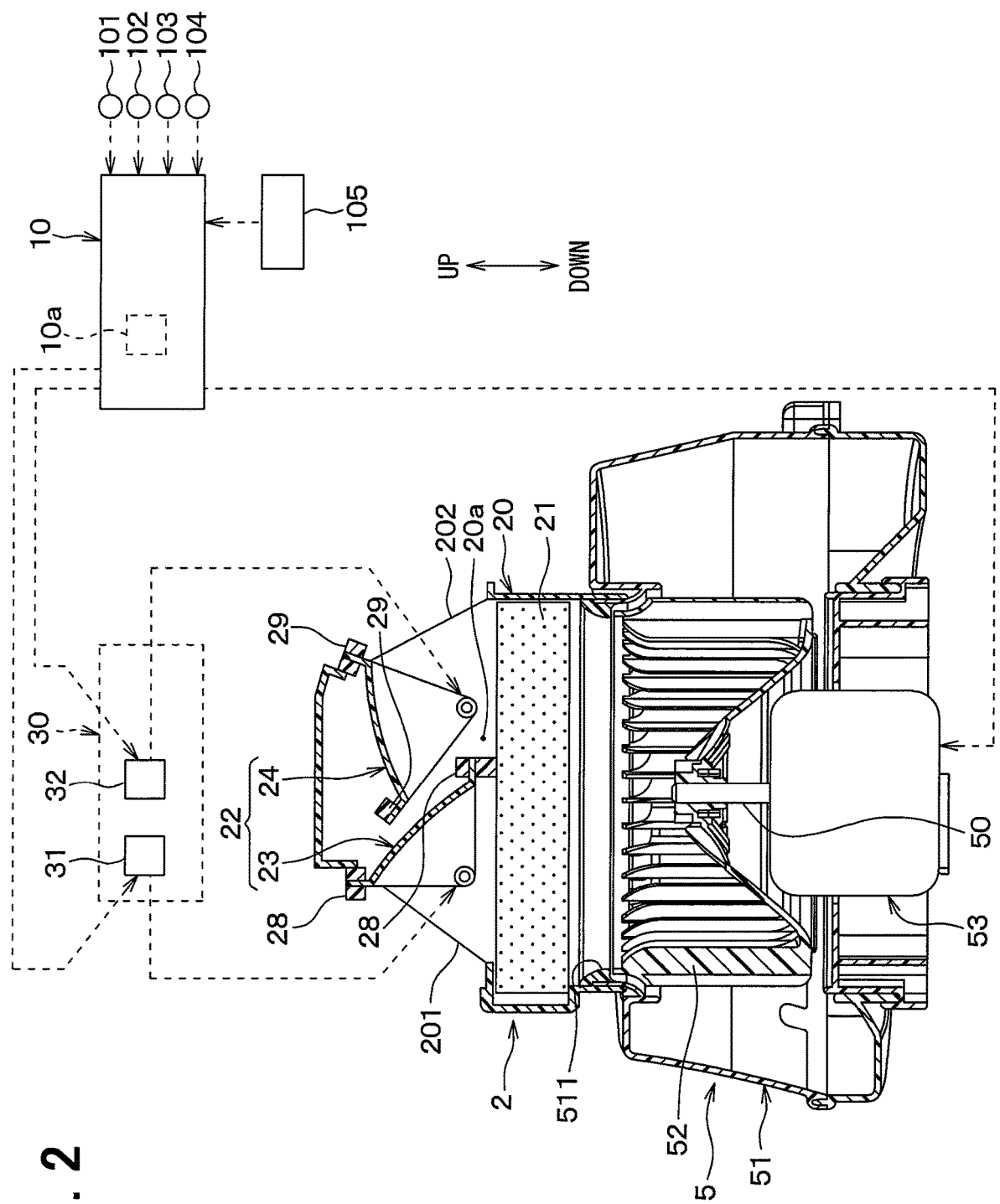
FIG. 2 is a cross-sectional view schematically showing an inside-outside air switching unit and a blower unit in a first embodiment.

As shown in FIG. 2, the air conditioner 1 is roughly divided into three units, i.e., the inside-outside air switching unit 2, a blower unit 5, and an air conditioning unit (not shown).

The inside-outside air switching unit 2 is located above the blower unit 5. The inside-outside air switching unit 2 and the blower unit 5 in the instrument panel 11 are assembled to be one unit and face a passenger seat.

The blower unit 5 serves as a blower that is configured to supply air into the vehicle compartment. The blower unit 5 includes a blower case 51 made of resin. The blower case 51 may be formed by a scroll case that defines a scroll passage therein. The blower case 51 includes a suction port 511 in an upper surface thereof and draws air from the suction port 511.

The blower case 51 houses a fan 52 that is configured to case an air flow to be supplied to the vehicle compartment. In the present embodiment, the fan 52 is a centrifugal sirocco fan that draws air along a rotational axial direction of a rotary shaft 50 and discharges the air radial outward. It should be noted that the fan 52 may be a turbo fan, a radial fan, or the like.

The fan 52 is rotationally driven by an electric motor 53 attached to the blower case 51. The electric motor 53 is attached to a portion of the blower case 51 on a side of the blower case 51 away from the suction port 511.

The air conditioning unit (not shown) is connected to a downstream end of the blower unit 5 in an airflow direction of the air. The air conditioning unit includes an air conditioning case that defines an air passage therein. The air conditioning case houses a cooling heat exchanger and a heating heat exchanger that are configured to adjust a temperature of the air to be supplied into the vehicle compartment. The blower case 51 discharges the air when the fan 52 rotates. The air is supplied into the vehicle compartment after a temperature of which is adjusted to be a required temperature in the air conditioning unit.

The inside-outside air switching unit 2 is configured to take in inside air (i.e., air inside the vehicle compartment) and outside air (i.e., air outside the vehicle compartment) selectively. The inside-outside air switching unit 2 includes an inside-outside air case 20 forming an outer shell thereof. The inside-outside air case 20 is formed of resin (e.g., polypropylene) having a certain degree of elasticity and an excellent strength.

The inside-outside air case 20 includes an outside-air inlet 201 that is configured to take in the outside air and an inside-air inlet 202 that is configured to take in the inside air. The outside-air inlet 201 and the inside-air inlet 202 are formed in a most upstream portion of the inside-outside air case 20 in the airflow direction. The outside-air inlet 201 is connected to an outside-air suction port (not shown) defined in a vehicle body.

An air filter 21 and a switching member 22 are arranged in the inside-outside air case 20. The switching member 22 is positioned upstream of the air filter 21 in the airflow direction and is configured to open and close the outside-air inlet 201 and the inside-air inlet 202. The inside-outside air case 20 defines an inside-outside communication passage 20a therein. The inside-outside communication passage 20a is defined between the outside-air inlet 201 and the inside-air inlet 202 and allows the outside-air inlet 201 and inside-air inlet 202 to be in communication with each other therethrough. The inside-outside communication passage 20a is an interior space defined in the inside-outside air case 20 by an upper wall of the inside-outside air case 20 and the air filter 21.

The air filter 21 is a filter that removes a foreign material such as dust from air flowing into the blower unit 5. The air filter 21 is formed of a material having air permeability. The material forming the air filter 21 may be a non-woven fabric with resin fiber such as PET or PP.

The switching member 22 includes an outside-air door 23, an inside-air door 24, and a drive mechanism 30 that is configured to rotate the outside-air door 23 and the inside-air door 24. The outside-air door 23 is configured to open and close the outside-air inlet 201. The inside-air door 24 is configured to open and close the inside-air inlet 202.

The outside-air door 23 and the inside-air door 24 are rotatably housed in the inside-outside air case 20. In the present embodiment, the outside-air door 23 and the inside-air door 24 each is configured by a rotary door. In the present embodiment, the outside-air door 23 and the inside-air door 24 are configured by rotary doors having the same shape in order to share parts.

Configurations of the outside-air door 23 and the inside-air door 24 in the present embodiment will be described hereafter in detail referring to FIG. 3. As described above, in the present embodiment, the outside-air door 23 and the inside-air door 24 are configured by rotary doors having the same shape. As such, FIG. 3 shows one of the outside-air door 23 and the inside-air door 24.

Figure 3:
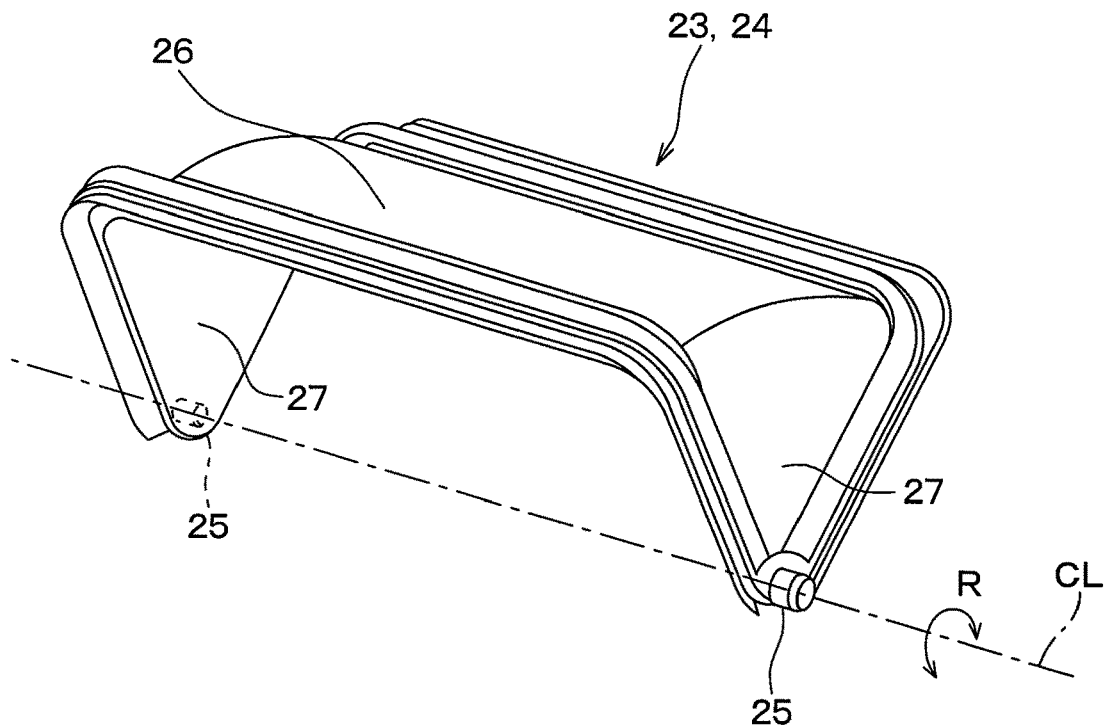
FIG. 3 is a perspective view schematically showing an outside-air door and an inside-air door in the first embodiment.

As shown in FIG. 3, the outside-air door 23 and the inside-air door 24 rotate about a longitudinal axis CL of a door shaft 25 in the present embodiment. Each of the outside-air door 23 and the inside-air door 24 includes the door shaft 25, an outer wall 26, and side plates 27. The outer wall 26 has an arc shape extending along a rotational direction R of the door shaft 25 in cross section. The side plates 27 are positioned at both ends of the outer wall 26 in an axial direction of the door shaft 25. The door shaft 25, the outer wall 26, and the side plate 27 are made of resin (e.g., polypropylene) and are molded integrally to be one piece.

The door shaft 25 is positioned at a portion serving as a linchpin of the side plates 27 that each has a fan shape. The door shaft 25 is supported rotatably relative to the inside-outside air case 20. The door shaft 25 is connected to the drive mechanism 30 shown in FIG. 2.

The outer wall 26 and the side plates 27 are configured to close the outside-air inlet 201 and the inside-air inlet 202 defined in the inside-outside air case 20. In the present embodiment, the outer wall 26 and the side plates 27 each has a dimension to be able to close the outside-air inlet 201 and the inside-air inlet 202 defined in the inside-outside air case 20. Specifically, the outer wall 26 has a dimension required to close the inside-outside communication passage 20a defined in the inside-outside air case 20.

As shown in FIG. 2, the outside-air door 23 and the inside-air door 24 in the present embodiment includes gaskets 28, 29 respectively in order to suppress a leak of air when opening and closing the outside-air inlet 201 and the inside-air inlet 202. The gaskets 28, 29 are fixed to peripheral edges of the outer wall 26 and the side plates 27 respectively by a method such as adhesion. The gaskets 28, 29 are formed of a porous material such as urethane foam preferably.

The drive mechanism 30 serves as a device that is configured to rotate the outside-air door 23 and the inside-air door 24. In the present embodiment, the drive mechanism 30 includes a first drive part 31, which is configured to operate the outside-air door 23, and a second drive part 32, which is configured to operate the inside-air door 24, so that the outside-air door 23 and the inside-air door 24 are operated independently.

The first drive part 31 and the second drive part 32 are independent from each other. The first drive part 31 and the second drive part 32 each includes a servo motor (not shown) connected to the door shaft 25 and a drive circuit (not shown) operating the servo motor. Operations of the first drive part 31 and the second drive part 32 are controlled separately based on controls signals from a controller 10 for the air conditioner 1 for a vehicle. For explanation purpose, the first drive part 31 and the second drive part 32 are circled by a dashed line showing the drive mechanism 30 in FIG. 2. However, it should be understood that the first drive part 31 and the second drive part 32 may be proximate to each other or may be positioned separately. In addition, although the drive mechanism 30 is illustrated above the inside-outside air switching unit 2, the drive mechanism 30 may not be positioned above the inside-outside air switching unit 2.

Here, the controller 10 of the air conditioner 1 for a vehicle is configured by a microcomputer, which includes a memory such as CPU, ROM, or RAM, and a peripheral circuit of the microcomputer. The controller 10 performs various calculations and processes based on control programs stored in the memory, and controls actuations of the various devices connected to the output side thereof. The memory of the controller 10 is configured by a non-transitional physical storage medium.

The electric motor 53 operating the fan 52 of the blower unit 5, the drive mechanism 30 operating the switching member 22 of the inside-outside air switching unit 2, and the various devices mounted to the air conditioning unit (not shown) are connected to the output side of the controller 10.

A sensor group including an inside-air sensor 101, an outside-air sensor 102, an insolation sensor 103, and a humidity sensor 104 is connected to an input side of the controller 10. The inside-air sensor 101 is configured to detect an inside-air temperature Tr. The outside-air sensor 102 is configured to detect an outside-air temperature Tam. The insolation sensor 103 is configured to detect a solar insolation amount Ts in the vehicle compartment. The humidity sensor 104 is configured to detect a relative humidity Rh in the vehicle compartment.

An operation panel 105 near the instrument panel 11 is also connected to the input side of the controller 10. The operation panel 105 is provided with various operation switches such as an air-conditioning operation switch and a temperature setting switch. The temperature setting switch may be configured to set a target temperature in the vehicle compartment. The air-conditioning operation switch may be a switch that is configured to output a request signal to the controller 10 so that the electric motor 53 of the fan 52 is operated to adjust a temperature of air supplied to the vehicle compartment from the air conditioning unit.

The controller 10 is configured integrally with control units that are configured to control various devices connected to its output side. The controller 10 serves as a control unit including hardware and/or software that is/are configured to control operations of the various devices.

For example, in the present embodiment, the controller 10 sets air intake modes by controlling the outside-air door 23 and the inside-air door 24 using the drive mechanism 30. Thus, in the present embodiment, hardware and/or software of the controller 10 configured to set the air intake modes by controlling the drive mechanism 30 may serve as a mode controller 10a. In the present embodiment, the drive mechanism 30 and the mode controller 10a serve as a drive unit that is configured to operate the switching member 22.

Next, operations of the inside-outside air switching unit 2 in the present embodiment will be described hereafter. In the present embodiment, the inside-outside air switching unit 2 is configured to set, as the air intake modes, an outside-air intake mode, an inside-air intake mode, and an inside-outside air intake mode selectively based on a control signal from the controller 10. For example, the controller 10 may set, as the air intake modes, the outside-air intake mode, the inside-air intake mode, and the inside-outside air intake mode selectively based on a heat load in air conditioning for the vehicle compartment or an operation signal from the operation panel. The heat load may be determined based on a target supply temperature, the outside-air temperature, and/or the relative humidity in the vehicle compartment.

Figure 4:
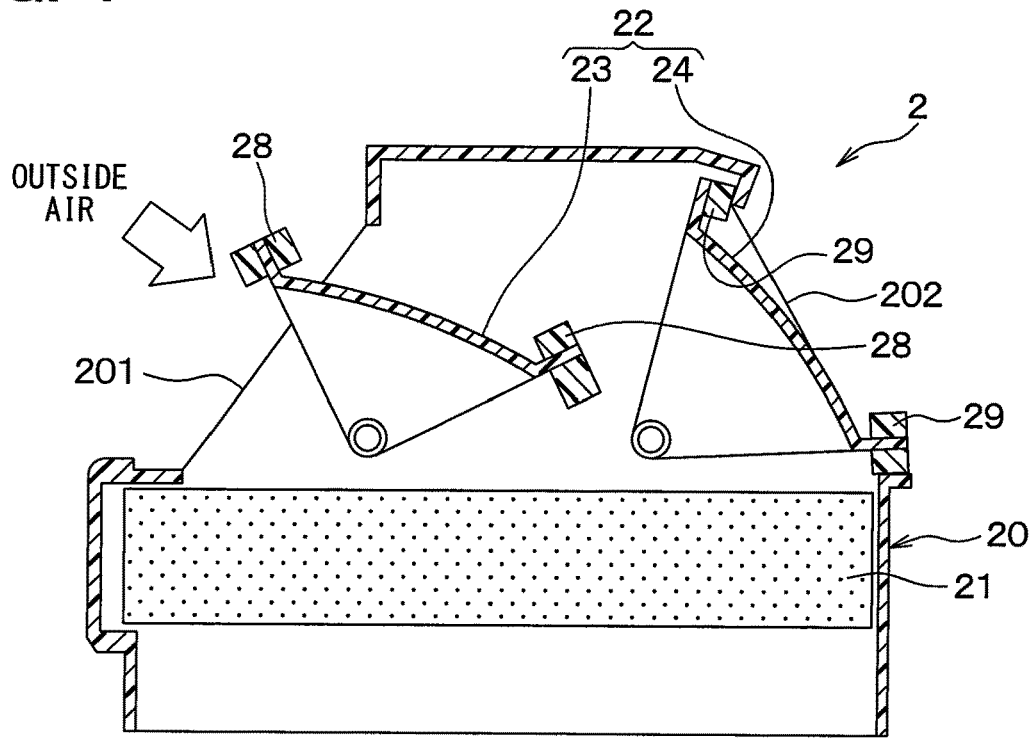
FIG. 4 is a cross-sectional view schematically showing the inside-outside air switching unit in an outside-air intake mode.

In the outside-air intake mode, the inside-outside air case 20 takes in the outside air. In the outside-air intake mode, the drive mechanism 30 moves the inside-air door 24 to close the inside-air inlet 202 and moves the outside-air door 23 to open the outside-air inlet 201 as shown in FIG. 4.

Specifically, in the present embodiment, the drive mechanism 30 moves the outside-air door 23 to open the outside-air inlet 201 and to open the inside-outside communication passage 20a in the outside-air intake mode so that a certain volume of the outside air is taken in.

Figure 5:
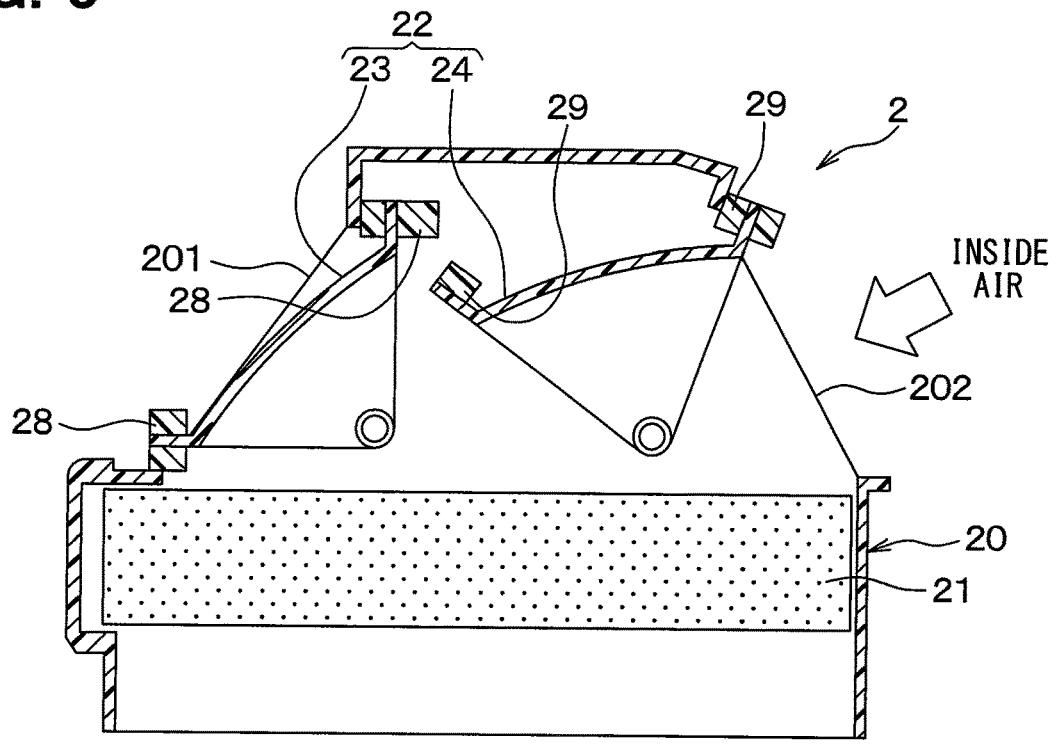
FIG. 5 is a cross-sectional view schematically showing the inside-outside air switching unit in an inside-air intake mode.

In the inside-air intake mode, the inside-outside air case 20 takes in the inside air. In the inside-air intake mode, the drive mechanism 30 moves the outside-air door 23 to close the outside-air inlet 201 and moves the inside-air door 24 to open the inside-air inlet 202 as shown in FIG. 5.

In the inside-outside air intake mode, the inside-outside air case 20 takes in both of the outside air and the inside air. In the inside-outside air intake mode, when the outside-air inlet 201 and the inside-air inlet 202 are in communication with each other through the inside-outside communication passage 20a, noise may easily transmit into the vehicle compartment from outside of the vehicle compartment via the inside-outside communication passage 20a. This is undesirable because it may cause a discomfort to an occupant.

Figure 6:
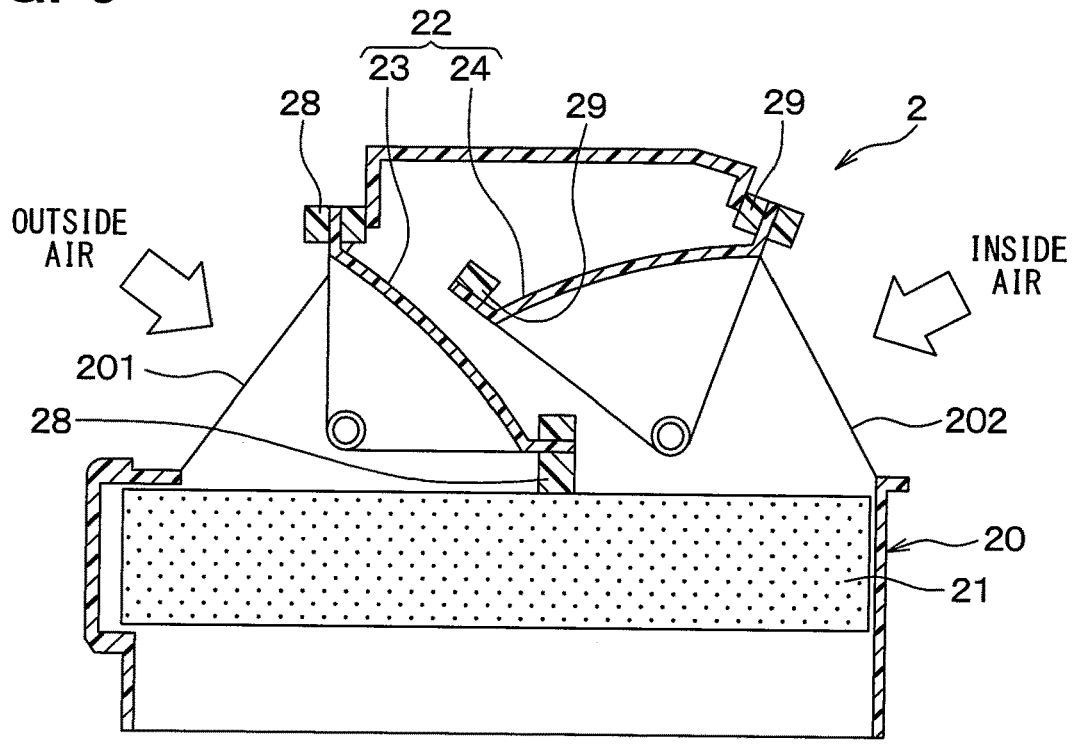
FIG. 6 is a cross-sectional view schematically showing the inside-outside air switching unit in an inside-outside air intake mode.

Then, in the inside-air intake mode, the drive mechanism 30 moves the outside-air door 23 to open the outside-air inlet 201 and to close the inside-outside communication passage 20a and moves the inside-air door 24 to open the inside-air inlet 202 as shown in FIG. 6.

In the present embodiment, the outside-air door 23 serves as a first switching door that is configured to be positioned by the drive mechanism 30 to open the outside-air inlet 201 in the inside-outside air intake mode. In addition, in the present embodiment, the inside-air door 24 serves as a second switching door that is configured to be positioned by the drive mechanism 30 to open the inside-air inlet 202 in the inside-outside air intake mode.

Here, when the controller 10 sets the inside-outside air intake mode, noise may transmit into the vehicle compartment from outside of the vehicle compartment when the inside-air door 24 opens the inside-air inlet 202 before the outside-air door 23 closes the inside-outside communication passage 20a.

Figure 7:
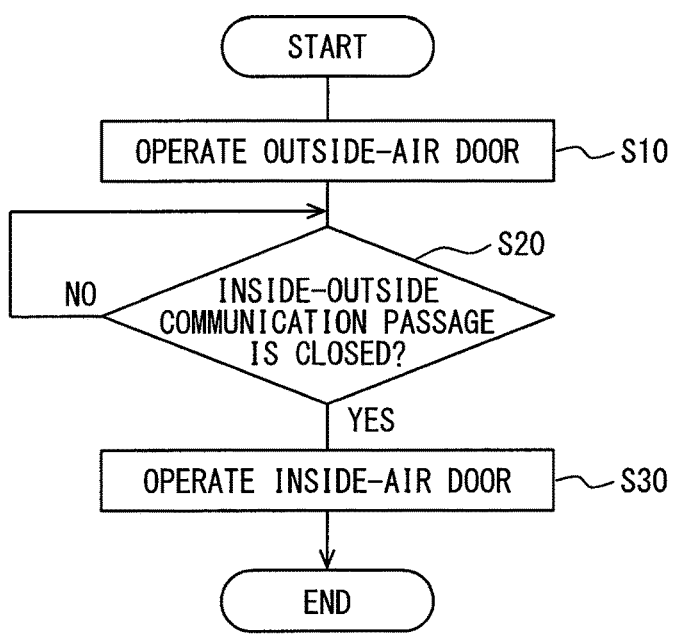
FIG. 7 is a flowchart showing a flow of operation process that is operated by a controller to operate the outside-air door and the inside-air door in the inside-outside air intake mode.

As such, in the present embodiment, the controller 10 controls the drive mechanism 30 to operate the outside-air door 23 and the inside-air door 24 as shown in FIG. 7 when setting the inside-outside air intake mode. That is, as shown in FIG. 7, the controller 10 moves the outside-air door 23 to open the outside-air inlet 201 and to close the inside-outside communication passage 20a at step S10. Subsequently, at step S20, the controller 10 determines whether the outside-air door 23 closes the inside-outside communication passage 20a. For example, the determination at step S20 may be executed based on a factor such as a rotational angle of the door shaft 25 of the outside-air door 23.

When the outside-air door 23 is determined not to close the inside-outside communication passage 20a at step S20, the controller 10 waits for the outside-air door 23 to close the inside-outside communication passage 20a completely.

On the other hand, when the outside-air door 23 is determined to close the inside-outside communication passage 20a at step S20, the controller 10 moves the inside-air door 24 to open the inside-air inlet 202 at step S30.

Here, in an environment in which the relative humidity Rh in the vehicle compartment is high in the inside-outside air intake mode, a window 12 of the vehicle may be fogged easier as the volume of the inside air increases. In contrast, in an environment in which the relative humidity Rh in the vehicle compartment is low in the inside-outside air intake mode, efficiency of the air conditioning in the inside-outside air intake mode may not be improved sufficiently.

Then, in the present embodiment, the controller 10 operates the inside-air door 24 so that an open area Sin of the inside-air inlet 202 changes depending on the relative humidity Rh in the vehicle compartment in the inside-outside air intake mode. The relative humidity Rh may be a detection value of the humidity sensor 104. That is, in the present embodiment, the controller 10 operates the inside-air door 24 so that the open area Sin of the inside-air inlet 202 decreases as the relative humidity Rh in the vehicle compartment rises in the inside-outside air intake mode. In other words, in the present embodiment, the controller 10 operates the inside-air door 24 so that the open area Sin of the inside-air inlet 202 increases as the relative humidity Rh in the vehicle compartment decreases in the inside-outside air intake mode.

Figure 8:
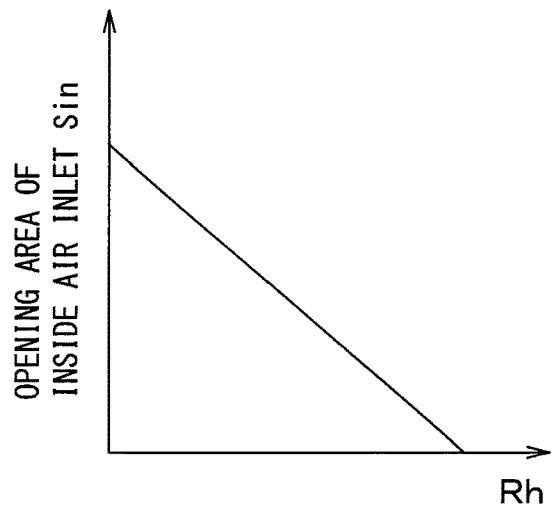
FIG. 8 is an explanatory view showing a relationship between a relative humidity in the vehicle compartment and an open area of the inside-air inlet when the inside-outside air switching unit sets the inside-outside air intake mode in the first embodiment.

More specifically, in the present embodiment, the controller 10 operates the inside-air door 24 so that the open area Sin of the inside-air inlet 202 decreases in proportion to an increase of the relative humidity Rh in the vehicle compartment as shown in FIG. 8.

The inside-outside air switching unit 2 of the above-described present embodiment is configured to operate the outside-air door 23 to close the inside-outside communication passage 20a defined in the inside-outside air case 20 in the inside-outside air intake mode. As such, noise from the outside of the vehicle compartment can be prevented from transmitting to the inside of the vehicle compartment through the inside-outside communication passage 20a. Specifically, since the outside-air door 23 closes the inside-outside communication passage 20a in the inside-outside air intake mode, the outside-air door 23 can change the volume of the inside air to take in by changing the open area Sin of the inside-air inlet 202.

Therefore, the present embodiment can produce the inside-outside air switching unit 2 that is configured to take in both outside air and inside air in an inside-outside air intake mode while preventing noise from transmitting from an outside of a vehicle compartment to an inside of the vehicle compartment.

In addition, in the inside-outside air switching unit 2 of the present embodiment, the controller 10 operates the inside-air door 24 so that the open area Sin of the inside-air inlet 202 decreases as the relative humidity Rh in the vehicle compartment rises in the inside-outside air intake mode. As such, the volume of the inside air taken in can be reduced when the relative humidity Rh in the vehicle compartment is high. As a result, the window 12 of the vehicle can be prevented from being fogged due to an inflow of the inside air into the vehicle compartment. Further, the volume of the outside air taken in can be increased when the relative humidity Rh in the vehicle compartment is low. As a result, the air conditioning can be performed with high efficiency.

Moreover, in the inside-outside air switching unit 2 of the present embodiment, the inside-air door 24 is positioned to open the inside-air inlet 202 while the outside-air door 23 closes the inside-outside communication passage 20a in the inside-outside air intake mode. Accordingly, the noise can be prevented from transmitting from outside of the vehicle compartment to inside of the vehicle compartment more efficiently in the inside-outside air intake mode.

Here, when the switching member 22 is formed of a single switching door, it may be difficult to adjust a ratio between an intake volume of the outside air and an intake volume of the inside air. For example, in a case where the switching member 22 is formed of a single switching door, the intake volume of the outside air may be reduced when the intake volume of the inside air is increased to reduce an air-conditioning load. As such, the window 12 of the vehicle may be fogged.

Then, in the present embodiment, the inside-outside air switching unit 2 includes the drive mechanism 30 that is formed of the first drive part 31 configured to operate the outside-air door 23 and the second drive part 32 configured to operate the inside-air door 24. As such, the outside-air door 23 and the inside-air door 24 can be operated independently. Therefore, the intake volume of the outside air and the intake volume of the inside air can be adjusted separately.

In addition, in the present embodiment, the inside-outside air switching unit 2 is configured to set, as the air intake modes, the outside-air intake mode, the inside-air intake mode, and the inside-outside air intake mode selectively.

As such, the inside-outside air case 20 can select which air to take in in response to usage environment.

Second Embodiment

Next, a second embodiment will be described with reference to FIG. 9. The present embodiment is different from the above-described first embodiment in a correspondence relationship between the relative humidity Rh in the vehicle compartment and the inside-air inlet 202 in the inside-outside air intake mode.

Figure 9:
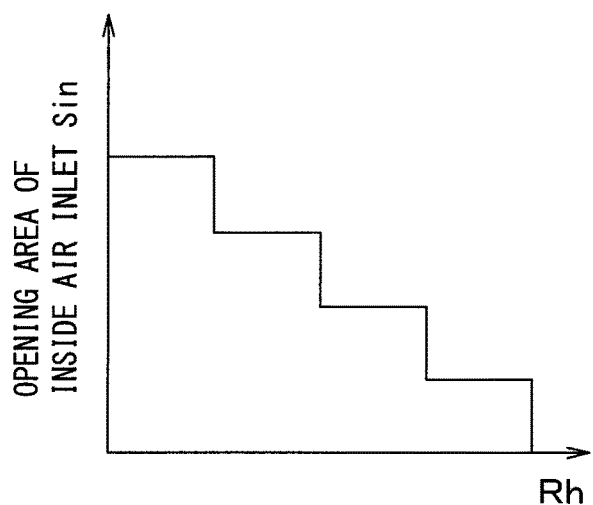
FIG. 9 is an explanatory view showing a relationship between a relative humidity in the vehicle compartment and an open area of the inside-air inlet when the inside-outside air switching unit sets the inside-outside air intake mode in a second embodiment.

In the present embodiment, the controller 10 operates the inside-air door 24 so that the open area Sin of the inside-air inlet 202 decreases gradually as the relative humidity Rh in the vehicle compartment rises in the inside-outside air intake mode as shown in FIG. 9. In other words, in the present embodiment, the controller 10 operates the inside-air door 24 so that the open area Sin of the inside-air inlet 202 increases gradually as the relative humidity Rh in the vehicle compartment decreases in the inside-outside air intake mode.

The remaining structures are the same as in the first embodiment. With the above-described configuration in the present embodiment, the same operational effects as in the first embodiment can be obtained.

Other Embodiments

The inside-outside air switching unit 2 of the present disclosure is described above with example embodiments. However, it should be understood that the inside-outside air switching unit 2 of the present disclosure is not limited to the above-described embodiments and may be modified, e.g., as follows.

As described above, in the above-described embodiments, the inside-outside air switching unit 2 is configured to change the open area Sin of the inside-air inlet 202 based on the relative humidity Rh in the vehicle compartment in the inside-outside air intake mode. However, the above-described embodiments are preferable example embodiments, and it should be understood that the present disclosure is not limited to the above-described embodiments. For example, the inside-outside air switching unit 2 may be configured to operate the inside-air door 24 so that the open area Sin of the inside-air inlet 202 is fixed in the inside-outside air intake mode.

As in the above-described embodiments, the inside-outside air switching unit 2 may be preferably configured to move the inside-air door 24 to open the inside-air inlet 202 while the outside-air door 23 closes the inside-outside communication passage 20a in the inside-outside air intake mode. However, the present disclosure is not limited to such example embodiments. For example, the inside-outside air switching unit 2 may be configured to move the inside-air door 24 to open the inside-air inlet 202 before the outside-air door 23 closes the inside-outside communication passage 20a completely in the inside-outside air intake mode.

The inside-outside air switching unit 2 includes the first drive part 31 configured to operate the outside-air door 23 and the second drive part 32 configured to operate the inside-air door 24 preferably as in the above-described embodiments. However, the present disclosure is not limited to such example embodiments. For example, the inside-outside air switching unit 2 may be configured to operate one of the outside-air door 23 and the inside-air door 24 with a drive part and to operate the other of the outside-air door 23 and the inside-air door 24 with a link mechanism connected to the drive part.

The inside-outside air switching unit 2 may be preferably configured to set, as the air intake modes, the outside-air intake mode, the inside-air intake mode, and the inside-outside air intake mode selectively as in the above-described embodiments. However, the present disclosure is not limited to such example embodiments. For example, the inside-outside air switching unit 2 may be configured to switch between the outside-air intake mode and the inside-outside air intake mode. Alternatively, the inside-outside air switching unit 2 may be configured to switch between the inside-air intake mode and the inside-outside air intake mode.

The outside-air door 23 and the inside-air door 24, serving as the switching member 22, each is formed of a rotary door in the above-described embodiments. However, the outside-air door 23 and/or the inside-air door 24 may be formed of another door such as a cantilever door or a butterfly door.

When the outside-air door 23 and the inside-air door 24 are the same in shape as in the above-described embodiments, the outside-air door 23 and the inside-air door 24 can be used in common. However, the outside-air door 23 and the inside-air door 24 may be different from each other in shape.

The constituent element(s) of each of the above embodiments is/are not necessarily essential unless it is specifically stated that the constituent element(s) is/are essential in the above embodiment, or unless the constituent element(s) is/are obviously essential in principle.

Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure.

Furthermore, in each of the above embodiments, in the case where the shape of the constituent element(s) and/or the positional relationship of the constituent element(s) are specified, the present disclosure is not necessarily limited to the shape of the constituent element(s) and/or the positional relationship of the constituent element(s) unless the embodiment specifically states that the shape of the constituent element(s) and/or the positional relationship of the constituent element(s) is/are necessary or is/are obviously essential in principle.

CONCLUSION

In a first aspect described in a part of or a whole of the above-described embodiments, the inside-outside air switching unit is configured to move the first switching door, which is one of the first switching door and the second switching door and is positioned between the outside-air inlet and the inside-air inlet, to close the inside-outside communication passage in the inside-outside air intake mode.

In a second aspect, the drive unit is configured to operate the second switching door so that the open area of the inside-air inlet decreases as the relative humidity in the vehicle compartment rises in the inside-outside air intake mode. As such, the intake volume of the inside air can be reduced when the relative humidity in the vehicle compartment is high. As a result, the window of the vehicle can be prevented from being fogged due to an inflow of the inside air into the vehicle compartment. In addition, when the relative humidity in the vehicle compartment is low, the intake volume of the outside air can be increased.

Here, when the controller sets the inside-outside air intake mode, noise may transmit into the vehicle compartment from outside of the vehicle compartment when the inside-air door opens the inside-air inlet before the outside-air door closes the inside-outside communication passage.

In contrast, in a third aspect of the present disclosure, the drive unit is configured to move the second switching door to open the inside-air inlet while the first switching door closes the inside-outside communication passage in the inside-outside air intake mode. Since the second switching door opens the inside-air inlet while the first switching door closes the inside-outside communication passage in the inside-outside air intake mode, noise can be prevented from transmitting from outside of the vehicle compartment to inside of the vehicle compartment in the inside-outside air intake mode more certainly.

Here, when the switching member is formed of a single switching door, it may be difficult to adjust the ratio between the intake volume of the outside air and the intake volume of the inside air. For example, in a case where the switching member is formed of a single switching door, the intake volume of the outside air may be reduced when the intake volume of the inside air is increased to reduce an air-conditioning load. As such, the window of the vehicle may be fogged.

Then, in a fourth aspect, the drive unit includes the first drive part configured to operate the first switching door and the second drive part configured to operate the second switching door. As such, the first switching door and the second switching door can be operated independently. Therefore, the intake volume of the outside air and the intake volume of the inside air can be adjusted separately.

In a fifth aspect, the drive unit is configured to move the first switching door to open the outside-air inlet and to move the second switching door to close the inside-air inlet in the outside-air intake mode in which the outside air is taken in. In the inside-air intake mode in which the inside air is taken in, the drive unit is configured to move the first switching door to close the outside-air inlet and to move the second switching door to open the inside-air inlet. Thus, the inside-outside air switching unit is configured to set, as the air intake modes, the outside-air intake mode, the inside-air intake mode, and the inside-outside air intake mode selectively. As such, the inside-outside air switching unit can select which air to take in in response to usage environment.

What is claimed is:

1. An inside-outside air switching unit that is configured to set an inside-outside air intake mode taking in both of outside air and inside air, comprising:
    an inside-outside air case that includes an outside-air inlet configured to take in the outside air and an inside-air inlet configured to take in the inside air;
    a switching member in the inside-outside air case, the switching member being configured to open and close the outside-air inlet and the inside-air inlet; and
    a drive unit that is configured to operate the switching member, wherein
    the switching member includes
        a first switching door that is configured to be positioned by the drive unit to open the outside-air inlet in the inside-outside air intake mode and
        a second switching door that is configured to be positioned by the drive unit to open the inside-air inlet in the inside-outside air intake mode,
    the drive unit positions the first switching door to close an inside-outside communication passage in the inside-outside air intake mode, the inside-outside communication passage being defined in the inside-outside air case and connecting the outside-air inlet and the inside-air inlet to each other,
    the drive unit moves the second switching door to reduce an open area of the inside-air inlet as a relative humidity in a vehicle compartment rises in the inside-outside air intake mode, and
    the drive unit includes
        a first drive part that is configured to operate the first switching door and
        a second drive part that is configured to operate the second switching door.

2. The inside-outside air switching unit according to claim 1, wherein
    the drive unit positions the second switching door to open the inside-air inlet while the first switching door closes the inside-outside communication passage in the inside-outside air intake mode.

3. The inside-outside air switching unit according to claim 1, wherein
    the drive unit
        positions the first switching door to open the outside-air inlet and positions the second switching door to close the inside-air inlet in an outside-air intake mode in which the outside air is taken in, and
        positions the first switching door to close the outside-air inlet and positions the second switching door to open the inside-air inlet in an inside-air intake mode in which the inside air is taken in.

4. An inside-outside air switching unit that is configured to set an inside-outside air intake mode taking in both of outside air and inside air, comprising:
    an inside-outside air case that includes an outside-air inlet configured to take in the outside air and an inside-air inlet configured to take in the inside air, the inside-outside air case having an upper wall;
    a switching member in the inside-outside air case, the switching member being configured to open and close the outside-air inlet and the inside-air inlet;
    a filter that is disposed in the inside-outside air case to be spaced away from the upper wall and that filters the outside air taken in through the outside-air inlet and the inside air taken in through the inside-air inlet; and
    a drive unit that is configured to operate the switching member, wherein
    an inside-outside communication passage is defined between the upper wall of the inside-outside air case and the filter,
    the switching member includes
        a first switching door that is configured to be positioned by the drive unit to open the outside-air inlet in the inside-outside air intake mode and
        a second switching door that is configured to be positioned by the drive unit to open the inside-air inlet in the inside-outside air intake mode,
    the drive unit positions the first switching door to close the inside-outside communication passage in the inside-outside air intake mode, the inside-outside communication passage being further defined in the inside-outside air case and connecting the outside-air inlet and the inside-air inlet to each other, the drive unit moves the second switching door to reduce an open area of the inside-air inlet as a relative humidity in a vehicle compartment rises in the inside-outside air intake mode, and the drive unit includes
- a first drive part that is configured to operate the first switching door and
- a second drive part that is configured to operate the second switching door.

5. The inside-outside air switching unit according to claim 1, further comprising:

an upper wall of the inside-outside air case; and a filter disposed in the inside-outside air case and spaced away from the upper wall, wherein the inside-outside communication passage is further defined between the upper wall of the inside-outside air case and the filter.

6. The inside-outside air switching unit according to claim 1, further comprising:

an upper wall of the inside-outside air case;

a filter disposed in the inside-outside air case and spaced away from the upper wall; and gaskets disposed at a first end and a second end of the first switching door and configured to abut the upper wall of the inside-outside air case and the filter to close the inside-outside communication passage in the inside-outside air intake mode.

* * * * *